(12) United States Patent  
Hough et al.

(10) Patent No.: US 9,398,335 B2
(45) Date of Patent: Jul. 19, 2016

(54) METHODS AND APPARATUS FOR USING USER ENGAGEMENT TO PROVIDE CONTENT PRESENTATION

(71) Applicant: QUALCOMM Incorporated, San Diego, CA (US)

(72) Inventors: Jason Hough, San Diego, CA (US); Jonathan K. Kies, Encinitas, CA (US); Scott Beith, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 625 days.

(21) Appl. No.: 13/688,212

(22) Filed: Nov. 29, 2012

(65) Prior Publication Data

US 2014/0150002 A1 May 29, 2014

(51) Int. Cl.
*H04N 21/442* (2011.01)
*H04N 21/4415* (2011.01)
*H04N 21/45* (2011.01)
*H04N 21/454* (2011.01)

(52) U.S. Cl.
CPC ..... *H04N 21/44213* (2013.01); *H04N 21/4415* (2013.01); *H04N 21/44218* (2013.01); *H04N 21/454* (2013.01); *H04N 21/4532* (2013.01)

(58) Field of Classification Search
None
See application file for complete search history.

(56) References Cited

U.S. PATENT DOCUMENTS

| 5,153,580 | A | 10/1992 | Pollack |
|---|---|---|---|
| 2003/0147624 | A1 | 8/2003 | Trajkovic et al. |
| 2003/0237093 | A1 | 12/2003 | Marsh |
| 2004/0252979 | A1* | 12/2004 | Momosaki et al. ............. 386/96 |
| 2005/0281531 | A1* | 12/2005 | Unmehopa .................... 386/46 |
| 2006/0188234 | A1 | 8/2006 | Takeshita |
| 2007/0033607 | A1 | 2/2007 | Bryan |
| 2007/0271580 | A1 | 11/2007 | Tischer et al. |
| 2009/0048908 | A1* | 2/2009 | Kaplan et al. .................. 705/10 |
| 2009/0052859 | A1 | 2/2009 | Greenberger et al. |
| 2009/0083631 | A1 | 3/2009 | Sidi et al. |
| 2010/0265397 | A1* | 10/2010 | Dasher et al. ................. 348/468 |
| 2010/0269127 | A1 | 10/2010 | Krug |
| 2011/0140840 | A1* | 6/2011 | Hardacker et al. .......... 340/5.83 |

(Continued)

FOREIGN PATENT DOCUMENTS

| WO | WO-02080531 A2 | 10/2002 |
|---|---|---|
| WO | WO-2007113580 A1 | 10/2007 |
| WO | WO-2009133364 A1 | 11/2009 |

OTHER PUBLICATIONS

International Search Report and Written Opinion—PCT/US2013/070831—ISA/EPO—Jun. 2, 2014.

(Continued)

*Primary Examiner* — Mark D Featherstone
(74) *Attorney, Agent, or Firm* — Shirin Tefagh

(57) ABSTRACT

A method, an apparatus, and a computer program product for communication are provided. A content providing device is operable to use engagement level information to modify presentation of content. In one aspect, the content providing device may determine that an engagement level at a first time is less than an engagement threshold at the first time. The engagement level may be based at least on one or more contextual items associated with presentation of content by the content providing device. Further, the content providing device may store a marker associated with the content at the first time in storage. Moreover, the content providing device may determine whether the engagement level at a second time is greater than or equal to the engagement threshold.

80 Claims, 7 Drawing Sheets

(56) References Cited

U.S. PATENT DOCUMENTS

| | | | |
|---|---|---|---|
| 2011/0142411 A1* | 6/2011 | Camp | 386/228 |
| 2011/0274405 A1* | 11/2011 | Godar | 386/224 |
| 2012/0124604 A1 | 5/2012 | Small et al. | |
| 2012/0281128 A1* | 11/2012 | Shintani | 348/333.01 |
| 2013/0047175 A1* | 2/2013 | Ramirez Flores et al. | 725/12 |
| 2013/0205311 A1 | 8/2013 | Ramaswamy et al. | |
| 2013/0205314 A1* | 8/2013 | Ramaswamy | H04N 21/44213 725/14 |
| 2013/0278824 A1* | 10/2013 | Einarsson | 348/468 |

OTHER PUBLICATIONS

Taiwan Search Report—TW102143459—TIPO—Aug. 25, 2015.

* cited by examiner

METHODS AND APPARATUS FOR USING USER ENGAGEMENT TO PROVIDE CONTENT PRESENTATION

BACKGROUND

The present application relates generally to device communications, and more specifically to methods and systems for using engagement level information for one or more users to modify presentation of content by a content providing device.

Content providing devices such as wireless communications devices, tablets, laptop computers, desktop computers, netbooks, televisions, etc., are widely deployed. Such content providing devices may present various types of content, such as video, audio, data, and so on.

During the presentation of content, a user may become distracted, may fall asleep, may leave the room, etc. In such instances the user may miss the content provided during that duration. As such, the user may have to attempt to manually determine a time in the content presentation at which the user became distracted so as to catch what was missed during the distraction.

Further, during presentation of content, a user for which the content may not be intended may enter the presentation environment (e.g., an area in which the content providing device may present content and may detect a presence of one or more users). For example, a first user may be watching a program flagged by the programming guide as "mature" (for example, violence, adult situations, adult language, etc.) and a second user for which the content may not be appropriate and/or enjoyable (e.g., a child, adolescent, spouse, parent, etc.) may enter the presentation environment with or without knowledge of the first user.

Additionally, during presentation of content, a level of interest for a user present in the presentation environment may change. For example, the user may fall asleep while watching a program. When more than one user is watching the program, the user that remained awake may manually reduce volume, switch to subtitles, or turn off the program entirely so as to attempt to not disturb the now asleep user.

Therefore, a system and method automatically modifies presentation of content based on engagement levels of one or more users may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to related aspects, a method for using engagement level information for one or more users to modify presentation of content is provided. The method can include determining that an engagement level at a first time is less than an engagement threshold at the first time. The engagement level may be based at least on one or more contextual items associated with presentation of content by a content providing device. Further, the method can include storing a marker associated with the content at the first time in storage. Moreover, the method may include determining whether the engagement level at a second time is greater than or equal to the engagement threshold.

Another aspect relates to a communications apparatus enabled to use engagement level information to modify presentation of content. The communications apparatus can include means for determining that an engagement level at a first time is less than an engagement threshold at the first time. The engagement level may be based at least on one or more contextual items associated with presentation of content by a content providing device. Further, the communications apparatus can include means for storing a marker associated with the content at the first time in storage. Moreover, the communications apparatus can include means for determining whether the engagement level at a second time is greater than or equal to the engagement threshold.

Another aspect relates to a communications apparatus. The apparatus can include a processing system configured to determine that an engagement level at a first time is less than an engagement threshold at the first time. The engagement level may be based at least on one or more contextual items associated with presentation of content by a content providing device. Further, the processing system may be configured to store a marker associated with the content at the first time in storage. Moreover, the processing system may further be configured to determine whether the engagement level at a second time is greater than or equal to the engagement threshold.

Still another aspect relates to a computer program product, which can have a computer-readable medium including at least one instruction for causing a computer to determine that an engagement level at a first time is less than an engagement threshold at the first time. The engagement level may be based at least on one or more contextual items associated with presentation of content by a content providing device. Further, the computer-readable medium can include at least one instruction for causing the computer to store a marker associated with the content at the first time in storage. Moreover, the computer-readable medium can include at least one instruction for causing the computer to determine whether the engagement level at a second time is greater than or equal to the engagement threshold.

To the accomplishment of the foregoing and related ends, the one or more aspects comprise the features hereinafter described in detail and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
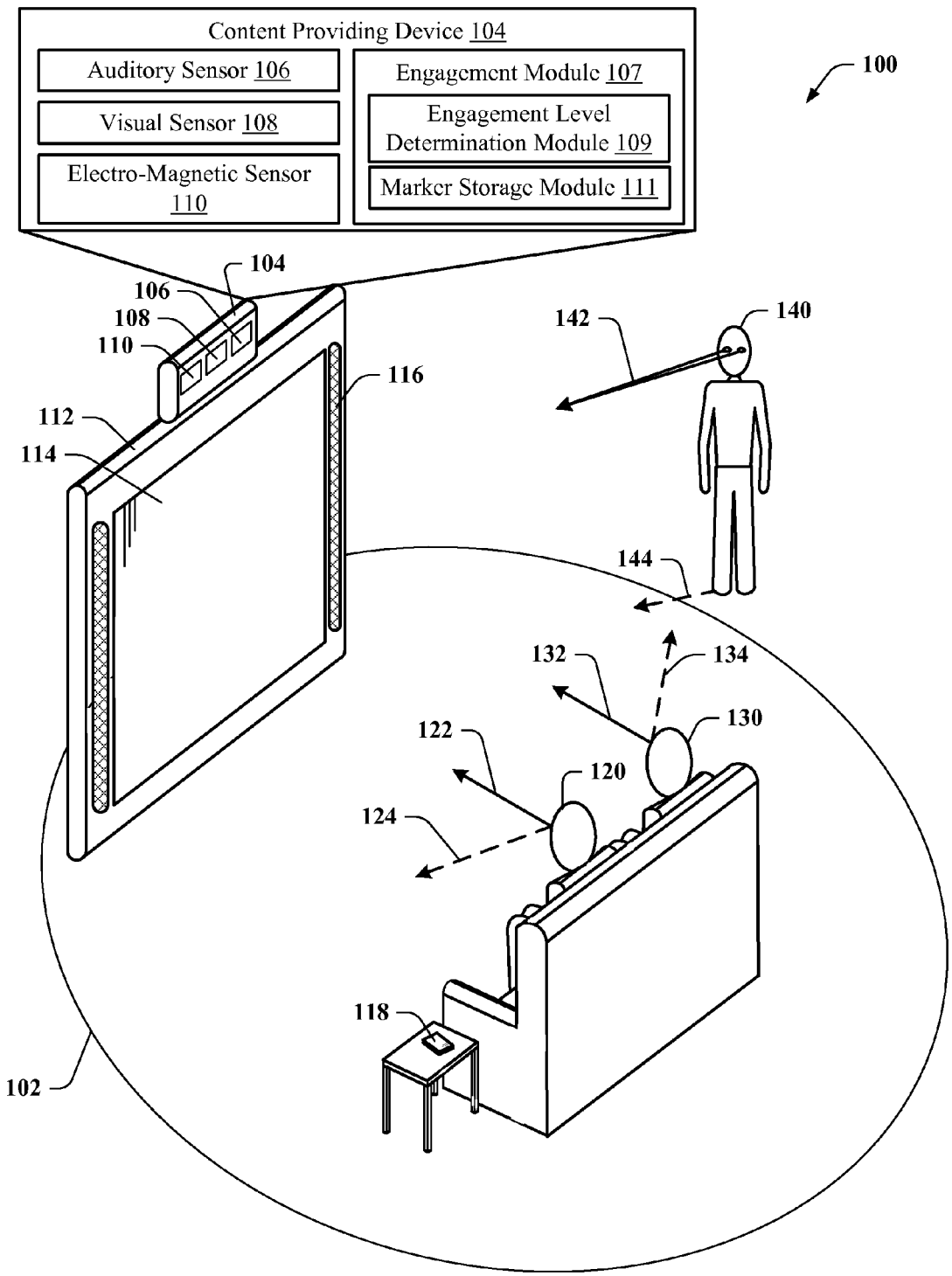
FIG. 1 depicts a block diagram of a communications system in which a content providing device is used, according to an aspect.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

A "content providing device" disclosed herein may be construed broadly to include an entity configured to present content. By way of example and not limitation, a content providing device may include a wireless communications device, a tablet, a laptop computer, a desktop computer, a netbook, a television, etc., or any combination thereof.

A "user" disclosed herein may be construed broadly to include any entity interacting with, contributing information to, and/or obtaining information from the content providing device.

"Content" disclosed herein may be construed broadly to include any data, information, a program, program information, podcasts, audiobooks, personal audio recording, etc., that is able to be presented using the content providing device. By way of example and not limitation, content may be configured to be presented visually and/or auditorily. Additionally, program information may be provided with the presented content, accessible from a program information entity, derived from an averaged noise level for the content, derived from analysis of closed captioning information, etc., or any combination thereof.

An "engagement level" disclosed herein may include one or more metrics used to determine a level of interest of a user in presentation of content. The engagement level may be based at least in part on contextual items associated with presentation of the content. By way of example and not limitation contextual items may include an ambient sound level, presence of distraction sounds, speech detected from users, a viewing direction of the user, etc., or any combination thereof.

An "engagement baseline" disclosed herein may include a value against which a user's engagement level may be compared to determine whether the user is distracted. The engagement baseline may be based on one or more engagement factors, such as but not limited to, an ambient sound level, a distraction propensity value based on a type of the content, a baseline viewing direction for a user, an ambient light level, etc., or any combination thereof.

A "presentation environment" disclosed herein may include an area, volume, etc., in which the content providing device may present the content and may detect the presence of one or more users.

According to one or more aspect, a content providing device may present and/or modify presentation of content to one or more users. The content providing device may be a single device in the presentation environment that is configured to determine an engagement level of at least one user and present and/or modify presentation of the content based on the determination. In another aspect, the content providing device may include multiple devices that may be configured to interact, and such interaction allows for the determination of the user's engagement level.

In operation, the content providing device may be configured to determine that an engagement level at a first time is less than an engagement threshold at the first time. Based on this determination, the content providing device may store a marker associated with the content at the first time in storage. Further, the content providing device may be configured to determine whether the engagement level at a second time is greater than or equal to the engagement threshold. In an optional aspect, the content providing device may provide one or more presentation options for the content from the first time upon the determination that the engagement level is greater than or equal to the engagement threshold at the second time.

FIG. 1 illustrates a block diagram of an exemplary system 100 in which a content providing device is operable, according to one aspect. System 100 may include a presentation environment 102 in which a content providing device 104 is operable to present content. Content providing device 104 may include and/or may be associated with one or more sensors, such as but not limited to, an auditory sensor 106, a visual sensor 108, an electro-magnetic sensor 110, etc. In an aspect, the auditory sensor 106 may be configured to detect auditory information, such as but not limited to, an ambient noise level, speech by a one or more users (120, 130) in the presentation environment 102, a volume level at which the content is being presented, etc., or any combination thereof. In an aspect, the visual sensor 108 may be configured to detect visual information, such as but not limited to, facial characteristics of one or more users (120, 130), a viewing direction (e.g., 122, 124, 132, 134) of the one or more users (120, 130), an ambient light level in the presentation environment 102, etc., or any combination thereof. In an aspect, the electro-magnetic sensor 110 may be configured to communicate with one or more other devices (e.g., device 118) in the presentation environment 102. For example, in an aspect, device 118 (e.g., terminal, client, user equipment (UE), wireless communications device (WCD)) may be associated with user 120 and may obtain various sensor information obtained for use by content providing device 104.

Content providing device 104 can include an engagement module 107 which may be operable to assist in determining an engagement level of one or more users (e.g., 120, 130). Engagement module 107 may include engagement level determination module 109, and marker storage module 111. In an aspect, engagement level determination module 109 may use one or more values obtained by various sensors (106, 108, 110) to determine whether a user's level of engagement has dropped below one or more thresholds. In another aspect, the thresholds may include an engagement threshold, a listening threshold level, etc. Additionally, engagement module 107 may use marker storage module 111 to assist in storing a marker with content that is being presented, upon a determination by engagement level determination module 109, that a user's engagement level has dropped below one or more of the thresholds.

Content providing device 104 may include and/or may be associated with a user interface. In an aspect, user interface may include a screen 112 and/or one or more speakers 116 that may be used for presentation of content.

Presentation environment 102 may further include one or more users (120, 130). In an aspect, content providing device 104 may be configured to determine an engagement level for at least one of the users (120, 130). The engagement level may be determined by content providing device 104 based on information obtained using sensors (106, 108, and/or 110). For example, users (120, 130) that are determined to have respective viewing directions (122, 132) that are looking at the screen 112 may have a higher engagement level that users (120, 130) that determined to have respective viewing directions (124, 134) that are looking in directions other than toward screen 112.

In an aspect, content providing device 104 may be configured to maintain a user profile for each user (120, 130). In such an aspect, content providing device 104 may use viewer-specific cues for distraction tolerance (e.g., correlated to content type). For example, a higher rate of distraction may be used when the content is presentation of a sporting event and multiple users (120, 130) are in the presentation environment 102.

In another aspect, content providing device 104 may be configured to detect arrival 144 and/or presence of a user 140 into the presentation environment 102. In such an aspect, an engagement level may be determined for the newly detected user 140. For example, the user's 140 viewing direction 142 may be used to determine the engagement level.

In an operational aspect, content providing device 104 may use one or more sensors (106, 108, 110) to establish engagement baseline and an engagement level of at least one of the users (120, 130). In an aspect, the engagement level may be determined based at least in part on contextual clues such as but not limited to ambient sound levels, detection of known sounds (e.g., phone ringing, door bell, user speech, etc.), conversation involve a primary user (e.g., user 120), eye-tracking to determine if the viewer is focused on the content providing device 104 screen 112. In an aspect, when the engagement level drops below an engagement threshold, a marker may be associated to content at a timing associated with the determined drop in engagement level. Further, the marker may be stored by content providing device 104. Thereafter, if the user (120, 130) engagement level rises above the engagement threshold, the content providing device 104 may prompt the user with an option to return to the point in the content presentation at which the user became distracted. In another aspect, content providing device 104 may return automatically to the point in the content presentation at which the user became distracted. In another aspect, a content type may factor into whether the content providing device 104 prompts the user with an option to return (e.g., where the content is a movie the prompt is provided, while where the content is a sporting event, a children's show, an advertisement, etc., the prompt is not provided). In another aspect, a user (120, 130) may enable/disable whether and/or when the prompt may be provided. In another aspect, when a user (120, 130) is determined to be distracted but the duration of the distraction is less than a threshold then no prompt may be provided when the user (120, 130) returns to an undistracted state.

In another operational aspect, content providing device 104 may be configured to modify presentation of content based on detection of the arrival 144 of another user 140. In an aspect, the modification to the presentation may further be based on a determination that the newly arrived user 140 is of a user type for which the content is not appropriate and/or enjoyable. For example, when an adult user 120 is watching content that is flagged as "mature," the content providing device 104 may pause presentation of the content when a child 140 is detected to have entered 144 the presentation environment 102. In an aspect, the content providing device 104 may use user profile information to determine whether to modify presentation of the content based on the arrival 144 of the user 140. In another aspect, if the program is rated as "mature" in a content guide, an option may be presented (e.g., during presentation of the program and/or during a setup phase), for the content providing device 104 to automatically pause the program (and/or blank the screen) upon the detected arrival 144 of the user 140 (e.g., a user whose profile indicates a non-adult age). In another aspect, an option may be presented to resume presentation of the program (e.g., at the discretion of an authorized user 120). In another aspect, when a user 120 is switching between various presentations of various content items (e.g., changing channels, scrolling through on-demand movie options, etc.), content providing device 104 may blank-out/flag content items that may not be appropriate and/or enjoyable for one or more other users (130, 140) present in the presentation environment 102.

In another operational aspect, where content providing device 104 may detect that an engagement level for a user 130 is below an engagement threshold while another user 120 maintains an engagement level above the engagement threshold. For example, a user 130 may fall asleep, may engage in a conversation with another user 140, may leave the presentation environment 102, etc. In an aspect, the level of interest of the user 130 may be detected based on the user's 130 head direction, whether the user's 130 eyes are open, whether the user 130 has moved locations, whether the user 130 has left a presentation environment 102, one or more biometric measurements, etc., or any combination thereof. In another aspect, the level of interest of the user 130 may be detected using one or more devices 118 associated with the user 130. In an aspect, content providing device 104 may focus presentation of content away from the distracted/asleep/absent user 130. Additionally or in the alternative, content providing device 104 may focus presentation of content toward an engaged user. Such focusing may be performed through use of closed captioning on screen 112, reducing an overall brightness level emitted by screen 112, use of sound focusing by speakers 116, reduction of an overall volume level by speakers 116, muting speakers 116, etc., or any combination thereof. In such an aspect, an overall auditory presentation volume level may be reduced to a level whether the auditory presentation focused towards the user 120 produces a substantially similar noise level at a location associated with the user 120 as a general auditory presentation produced at the location.

As such, a communications system 100 is presented in which a content providing device 104 may present and/or modify presentation of content to one or more users (120, 130, 140) based on one or more engagement related factors.

FIGS. 2-5 illustrate various methodologies in accordance with various aspects of the presented subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 2:
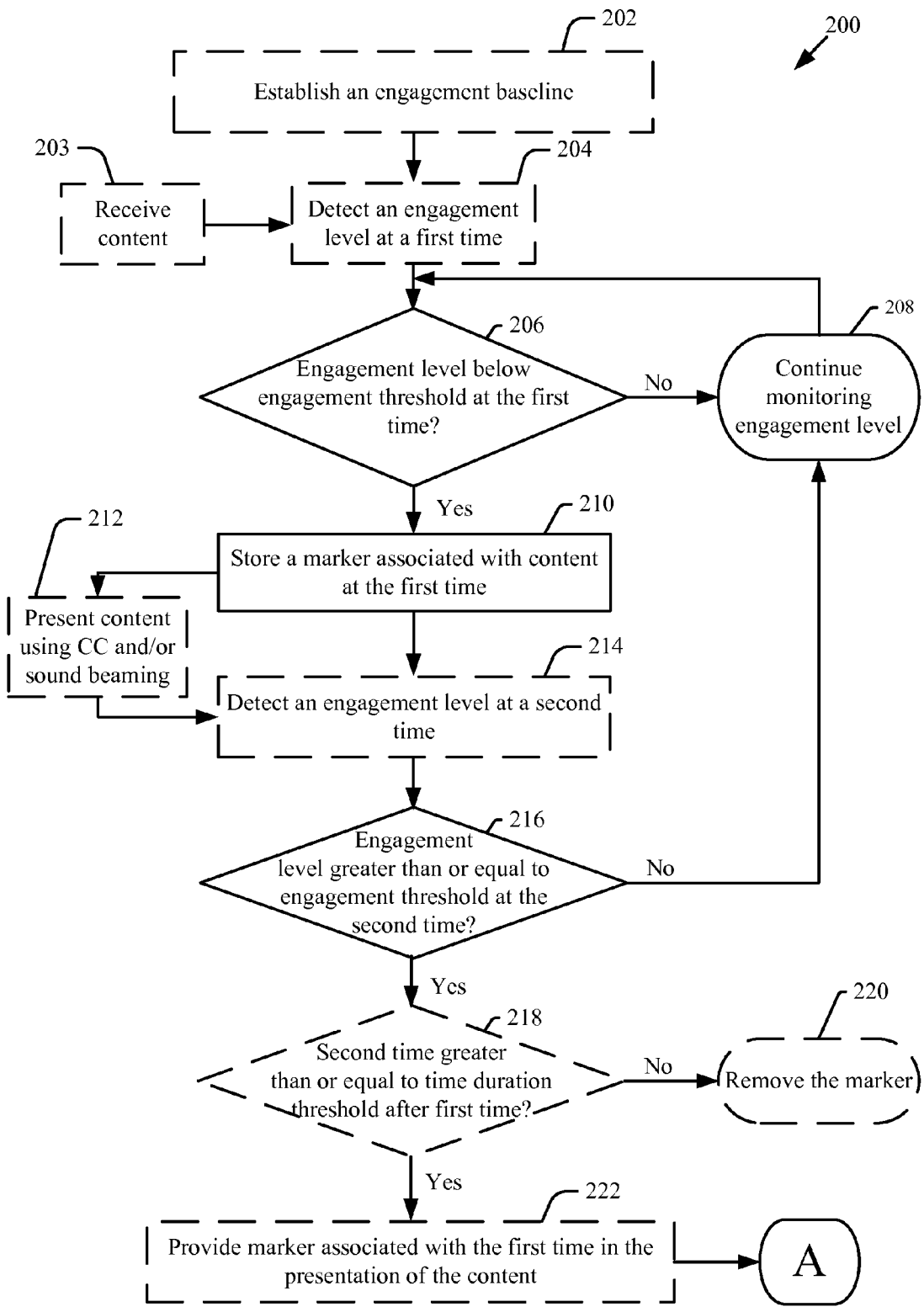
FIG. 2 depicts a flowchart describing a system for using engagement level information to modify presentation of content, according to an aspect.

FIG. 2 depicts a flowchart describing a system for using engagement level information to modify presentation of content. In an optional aspect, at block 202, one or more sensors, inputs, measurements, etc. accessible to a content providing device may be used to determine a baseline engagement level for a presentation environment. In an aspect, the baseline may be established for the presentation environment, based at least in part on, ambient sound levels, propensity to distraction based on content type (drama, sports, etc.), propensity to distraction based on one or more user profile characteristics (age, prior usage, user inputted information, etc.) etc.). In an aspect, the baseline value may be used to generate an engagement threshold level.

In an optional aspect, at block 203, the content providing device may receive content. In an aspect, the content may be received via a broadcast transmission, a multicast transmission, a unicast transmission, or any combination thereof.

In an optional aspect, at block 204, one or more sensors, inputs, measurements, etc. accessible to a content providing device may be used to detect an engagement level of presented content at a first time. In an aspect, visual, auditory, and/or contextual clues may be used by the content providing device to determine an engagement level (EL) for a user (e.g., viewer, listener, etc.). In such an aspect, contextual clues may be, but are not limited to, ambient sound levels, detection of known sounds (phone ringing, door bell, text message received sound, a user specified sound, etc.), one or more users engaged in conversation, eye-tracking to determine if the user is focused on a device display, etc.

At block 206, the content providing device determines whether the detected engagement level is less than the engagement threshold level. In an aspect in which multiple users are present, engagement levels may be determined for one or more of the users, for a primary user, for all the users, etc. If at block 206, the engagement level is not less than the engagement threshold level, then at block 208, the content providing device may continue to monitor the engagement level associated with one or more users within a presentation environment and return to block 206. In an aspect, the engagement level may be determined for one or more of multiple users (e.g., for all users, for a primary user, etc.).

By contrast, if at block 206, the content providing device determines that the engagement level is less than the engagement threshold level, then at block 210, the content providing device may store a marker associated with the content at the first time. In an aspect, the marker may be stored in memory associated with content providing device. In another aspect, the marker may be stored in a manner so as to make the marker accessible (e.g., network based storage, providing the marker as a parameter in a message broadcast by the content providing device, etc.) to one or more other content providing devices associated with the user. In another aspect, marker storage may involve analyzing a sound profile of the content for a lull threshold time duration prior to the first time to detect a lull in the content presentation, and storing the marker at the detected lull in the content presentation.

In an optional aspect, at block 212, the content providing device may provide closed captioning, subtitles, etc. associated with the content when audio levels in the presentation environment rise to above a listening threshold level. In such an aspect, the language used for the closed captioning, subtitles, etc., may be based on information in a user profile. Further, in such an aspect, the closed captioning, subtitles, etc., may be removed once the noise levels drop below the listening threshold level. In another optional aspect, at block 212, the content providing device may provide the content using sound beaming to one or more specified users within the presentation environment.

At block 214, the content providing device may detect an engagement level at a second time, after the first time.

At block 216, the content providing device may determine whether the engagement level at the second time is greater than or equal to the engagement threshold. If at block 216, the engagement level is not greater than or equal to the engagement threshold level, then at block 208, the content providing device may continue to monitor the engagement level associated with one or more users within the presentation environment.

By contrast, if at block 216, the engagement level is greater than or equal to the engagement threshold level, then at block 218, the content providing device may determine whether the second time is at least a threshold time duration (e.g., 30 seconds) after the first time.

If at block 218, it is determined that the second time is not at least the threshold time duration after the first time, then at block 220, the marker may be removed (e.g., deleted from memory, marked as available to be written over, etc.).

By contrast, if at block 218, it is determined that the second time is at least the threshold time duration after the first time, then at block 222, a prompt may be provided to a user indicating that the marker associated with the first time is available. The user may select to return to presentation of the content from the first time. In another aspect, the user may select to continue presentation of the content. In still another aspect, the user may ignore, delete, etc. the information promoted in the prompt. In another aspect, the user may select to present the content at a reduced volume level, using closed captioning. Thereafter, the process described with respect to FIG. 2, may progress to the block labeled "A".

Figure 3:
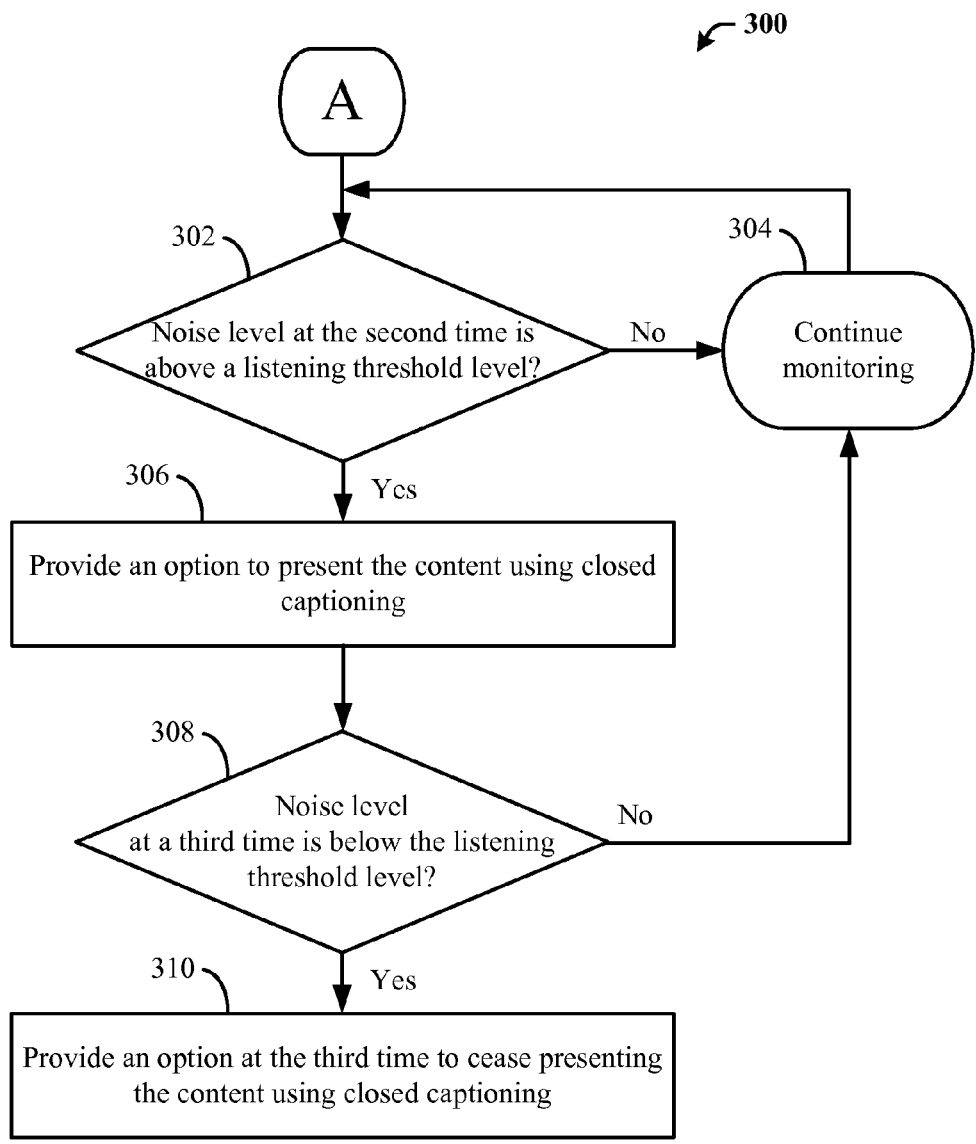
FIG. 3 depicts another flowchart describing a system for using engagement level information to modify presentation of content, according to an aspect.

FIG. 3 depicts another flowchart describing a system for using engagement level information to modify presentation of content. Continuing the flowchart described with respect to FIG. 2, following "A", at block 302, the content providing device determines whether a noise level at the second time is above a listening threshold level. For example, the content providing device may measure an ambient noise level, occurrence of a conversation between one or more users in the presentation environment, etc., and determine that the measured noise value is above the listening threshold level. In another aspect, the listening threshold level may be configurable. For example, the listening threshold level may be defined by a user, may be varied based on one or more content attributes, etc., or any combination thereof.

If at block 302, the content providing device determines that the noise level is not above the listening threshold level, then at block 304, the content providing device may continue to monitor the noise level in the presentation environment and return to block 302.

By contrast, if at block 302, the content providing device determines that the noise level is above the listening threshold level, then at block 306, the content providing device may provide an option to present the content in a modified manner (e.g., using closed captions). In as aspect, a language used during presentation of the content using closed captioning may be determined based on information stored with a user profile.

At block 308, the content providing device may determine whether the noise level at a third time is below the listening threshold level. In an aspect, the third time may be a defined duration after the second time so as to potentially reduce occurrence of content presentation modifications.

If at block 308, the content providing device determines that the noise level at the third time is not below the listening threshold level, then at block 304, the content providing device may continue to monitor the noise level in the presentation environment.

By contrast, if at block 308, the content providing device determines that the noise level at the third time is below the listening threshold level, then at block 310, the content providing device may provide an option to resume presentation of the content in a non-modified format (e.g., without closed captioning). In another aspect, the content providing device may automatically return to presentation of the content in the non-modified format upon the determination.

Figure 4:
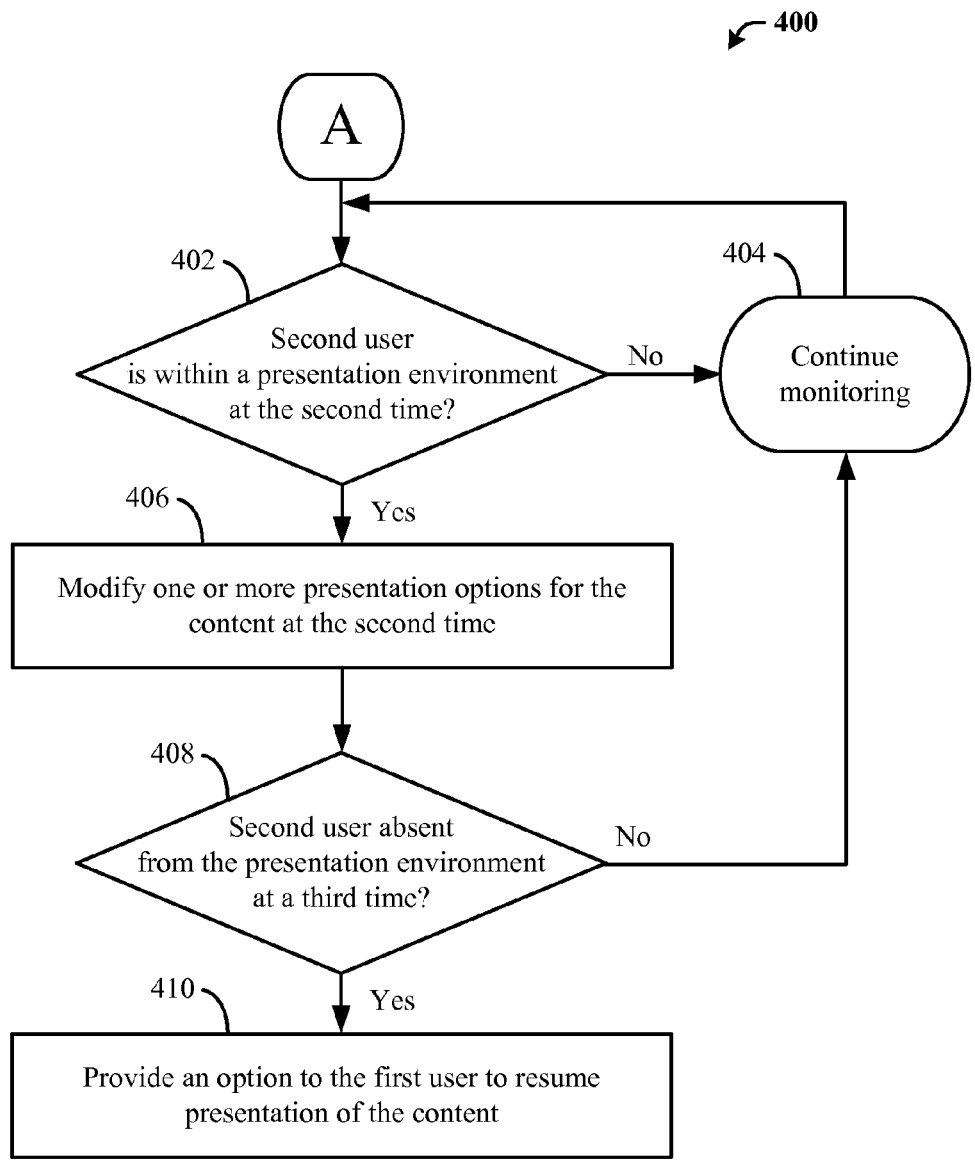
FIG. 4 depicts another flowchart describing a system for using engagement level information to modify presentation of content, according to an aspect.

FIG. 4 depicts another flowchart describing a system for using engagement level information to modify presentation of content. Continuing the flowchart described with respect to FIG. 2, following "A", at block 402, the content providing device determines whether there is a second user present for which access to the content may not be allowed. In an aspect, a user type may be detected based on a user's height, inputted age, prior usage, etc., or any combination thereof. For example, where a primary user is determined to be an adult, and another user is determined to be a child, and an attributed associated with the content indicates that the content may include "mature" content, then the child user may not be allowed to obtain the content. In another aspect, the attributes may be any of violence, adult language, adult situations, or any combination thereof. In another aspect, program information about the content may be accessible from information provided with the presented content, information accessible from a program information entity, information derived from an averaged noise level for the content, information derived from analysis of closed captioning information, or any combination thereof. If at block 402, the one or more detected users are allowed to access the content, then the content may be presented, and at block 404, the content providing device may continue to monitor for the presence of one or more users for which access to the content may not be allowed and return to block 402.

By contrast, if at block 402, the content providing device determines the presence of one or more users for which access to the content may not be allowed, then at block 406, the content providing device may modify presentation of the content. In an aspect, the modification of the content presentation may include, but is not limited to, any combination of pausing the content presentation, providing a blank/black screen, providing program information associated with the content, reducing volume and/or muting auditory presentation of the content, providing closed captioning/subtitles, etc. In such an aspect, a language used during presentation of the content using closed captioning may be determined based on information stored in a user profile.

At block 408, the content providing device may determine whether a user for which presentation of the content may not be allowed is still present in the presentation environment. If at block 408, the presence is detected of a user for which presentation of the content may not be allowed, then at block 404, the content providing device may continue to monitor the presence of one or more users in the presentation environment. In another aspect, an authorized user may select to resume presentation of the content.

By contrast, if at block 408, the presence of a user for which presentation of the content may not be allowed is no longer detected, then at block 410, the content providing device may present the content in an unmodified manner.

Figure 5:
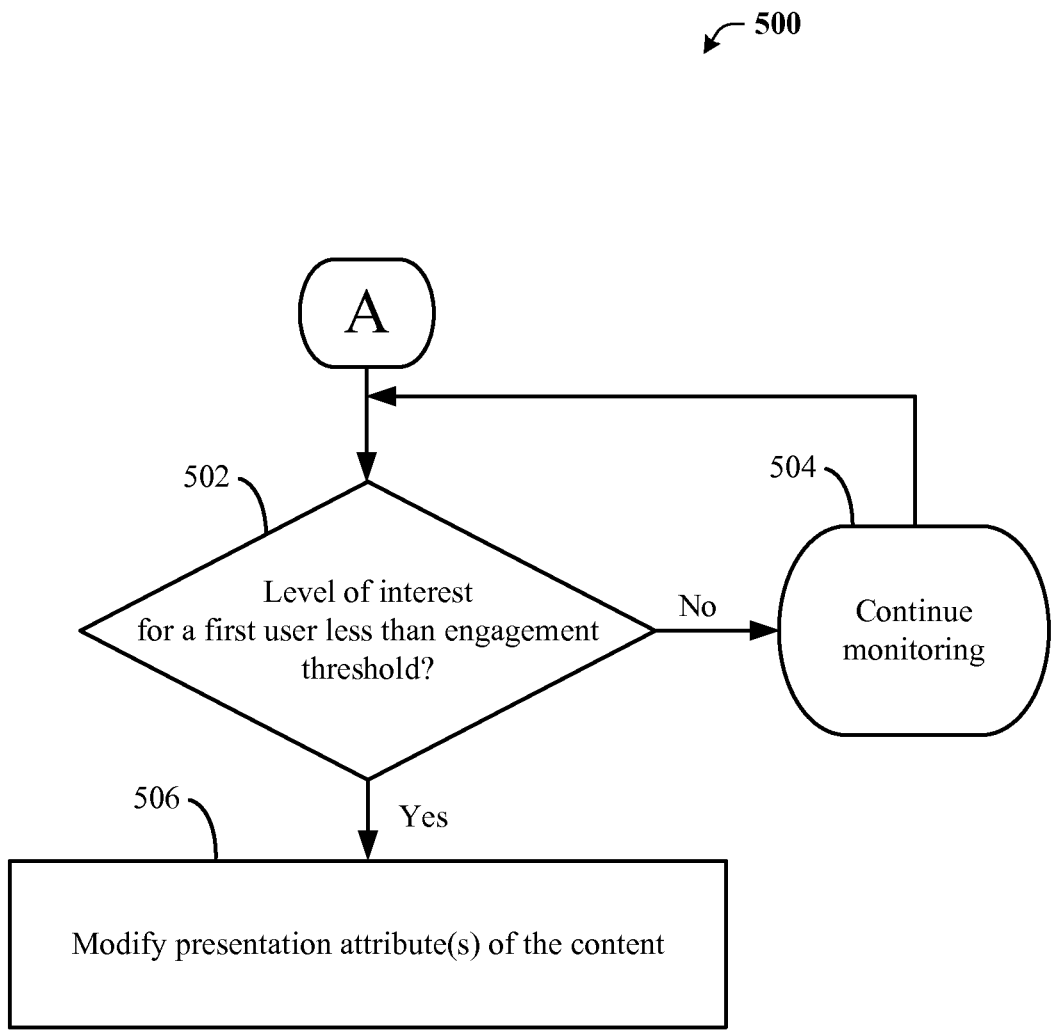
FIG. 5 depicts another flowchart describing a system for using engagement level information to modify presentation of content, according to an aspect.

FIG. 5 depicts another flowchart describing a system for using engagement level information to modify presentation of content. Continuing the flowchart described with respect to FIG. 2, following "A", at block 502, the content providing device determines whether there is a change in an interest level for one or more users in the presentation environment. For example, one of the users may be detected to have fallen asleep, become distracted, etc. In an aspect, the level of interest may be detected based on the first user's head direction, whether the first user's eyes are open, whether the first user has moved locations, whether the first user has left a presentation environment, one or more biometric measurements, etc., or any combination thereof. In another aspect, the level of interest may be detected using one or more devices associated with the user. If at block 502, there is no change in the interest level for one or more users, then at block 504, the content providing device may continue to monitor the level of interest in the presented content for the one or more users and return to block 502.

By contrast, if at block 502, the content providing device detects a change in a level of interest for a user, then at block 506, the content providing device may modify auditory and/or visual presentation of the content. In an aspect, the modification of the content presentation may include, but is not limited to, any combination of pausing the content presentation, using sound beaming to focus the auditory presentation toward an engaged user, reducing volume and/or muting auditory presentation of the content, reducing volume and/or muting auditory presentation of a feed associated with the user detected to have the reduced interest level (e.g., asleep), providing closed captioning/subtitles, etc. For example, where a viewer has fallen asleep and another viewer or viewers are present and awake, a focused sound mode can be switched to (if not already active), and the program sound level directed at the awake viewer(s). In such an example aspect, the auditory mode may be switched to automatically or offered as a prompt for the viewer that is awake. In an aspect, when there is only one viewer and/or if all viewers have fallen asleep, one or more markers may be stored indicating where at least one of and/or each of the viewers fell asleep. In another aspect, the modified auditory presentation of the content may be modified so as to keep sound focused (or at normal volume) for engaged viewers, and turn off or reduce volume for distracted viewers.

A user may configure various attribute, features, functions, etc., associated with the processes described with respect to FIGS. 2-5. For example, determinations as to whether to allow any prompts to be presented, when to provide a prompt, a default response to detection of a user that is asleep, etc., may be configured by a user.

Figure 6:
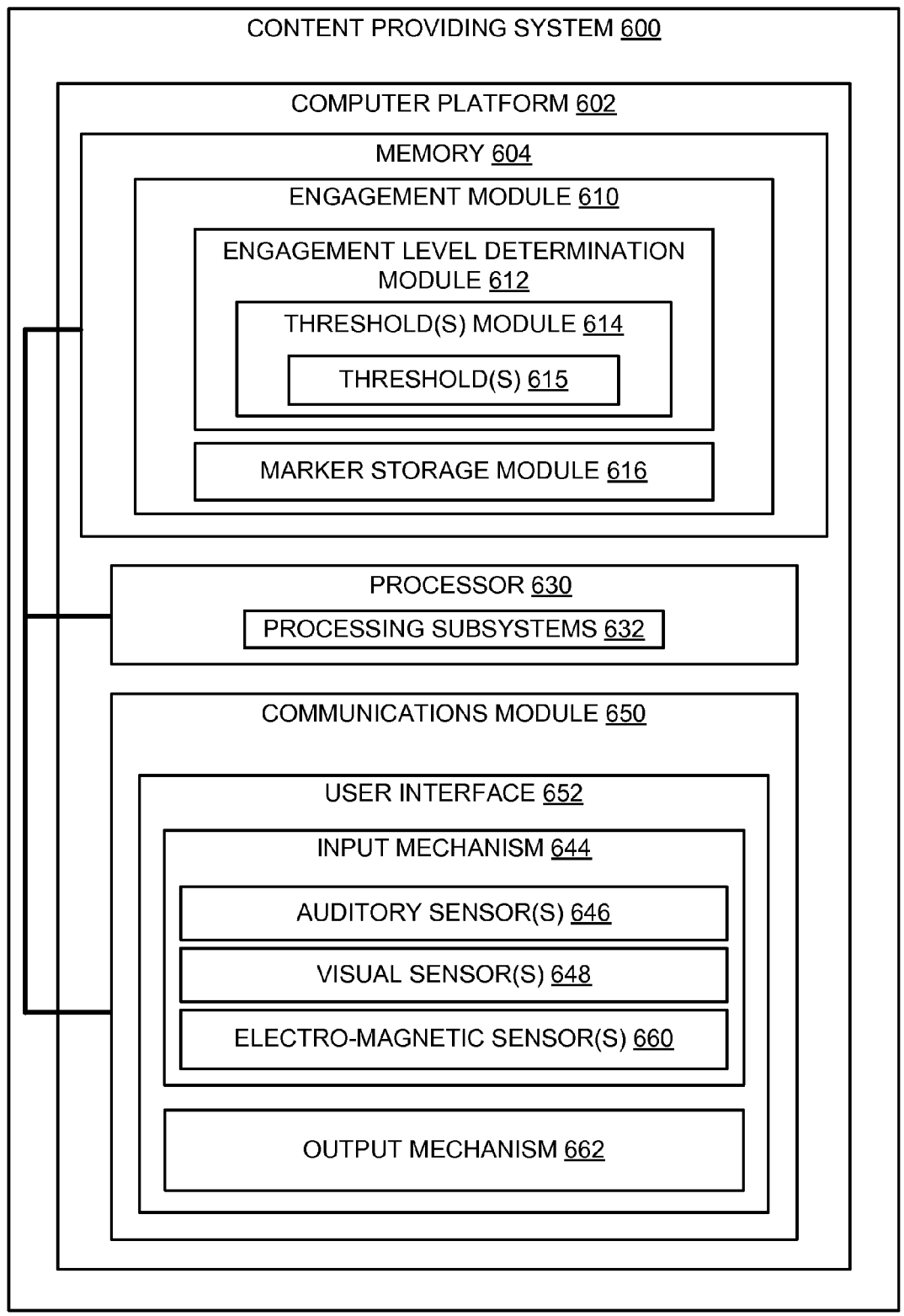
FIG. 6 depicts a block diagram of an example content providing system for using engagement level information to modify presentation of content, according to an aspect.

FIG. 6 depicts a block diagram of an example content providing system 600 (e.g., content providing device 104) operable to use engagement level information for one or more users to modify presentation of content. Content providing system 600 may comprise at least one of any type of hardware, server, personal computer, mini-computer, mainframe computer, or any computing device either special purpose or general computing device. Further, the modules and applications described herein as being operated on or executed by content providing system 600 may be executed entirely on a single network device, as shown in FIG. 6, or alternatively, in other aspects, separate servers, databases or computer devices may work in concert to provide data in usable formats to parties, and/or to provide a separate layer of control in the data flow between devices, and the modules and applications executed by content providing system 600.

Content providing system 600 includes computer platform 602 that can transmit and receive data across wired and wireless networks, and that can execute routines and applications.

Computer platform 602 includes memory 604, which may comprise volatile and nonvolatile memory such as read-only and/or random-access memory (ROM and RAM), EPROM, EEPROM, flash cards, or any memory common to computer platforms. Further, memory 604 may include one or more flash memory cells, or may be any secondary or tertiary storage device, such as magnetic media, optical media, tape, or soft or hard disk. Further, computer platform 602 also includes processor 630, which may be an application-specific integrated circuit ("ASIC"), or other chipset, logic circuit, or other data processing device. Processor 630 may include various processing subsystems 632 embodied in hardware, firmware, software, and combinations thereof, that enable the functionality of content providing system 600 and the operability of the network device on a wired or wireless network.

Processor 630, communications module 650, processor 630, memory 604, and/or engagement module 610 may provide means for determining that an engagement level at a first time is less than an engagement threshold at the first time, means for storing a marker associated with the content at the first time in storage, means for determining whether the engagement level at a second time is greater than or equal to the engagement threshold. The engagement level may be based at least on one or more contextual items associated with presentation of content.

Computer platform 602 further includes communications module 650 embodied in hardware, firmware, software, and combinations thereof, that enables communications among the various components of content providing system 600, as well as between content providing system 600, device 118, and/or one or more content providers. Communications module 650 may include the requisite hardware, firmware, software and/or combinations thereof for establishing a communication connection. According to one or more of the described aspects, communications module 650 may include the necessary hardware, firmware and/or software to facilitate wireless and/or wireline communication between content providing system 600 and device 118, and/or one or more content providers. Additionally, communications module 650 may include user interface 652. User interface 652 may include input mechanisms 644 for generating inputs into content providing system 600, and output mechanism 662 for generating information for consumption by the user of content providing system 600. For example, input mechanism 644 may include a mechanism such as a key or keyboard, a mouse, a touch-screen display, a microphone, etc. Further, for example, output mechanism 662 may include a display, an audio speaker, a haptic feedback mechanism, a Personal Area Network (PAN) transceiver, etc. In one aspect, output mechanism 662 may include a display operable to present content that is in image or video format or an audio speaker to present content that is in an audio format. In one aspect, input mechanism 644 may further include various sensors, such as but not limited to an auditory sensor 646, a visual sensor 648, an electro-magnetic sensor 660, etc. In an aspect, the auditory sensor 646 may be configured to detect auditory information, such as but not limited to, an ambient noise level, speech by a one or more users in the presentation environment, a volume level at which the content is being presented, etc., or any combination thereof. In an aspect, the visual sensor 648 may be configured to detect visual information, such as but not limited to, facial characteristics of one or more users, a viewing direction of the one or more users, an ambient light level in the presentation environment, etc., or any combination thereof. In an aspect, the electro-magnetic sensor 660 may be configured to communicate with one or more other devices (e.g., device 118) in the presentation environment.

Memory 604 of content providing system 600 can include an engagement module 610 which may be operable to assist in determining an engagement level of one or more users. Engagement module 610 may include engagement level determination module 612, and marker storage module 616. In an aspect, engagement level determination module 612 may use one or more values obtained by various sensors (646, 648, 660) to determine whether a user's level of engagement has dropped below a threshold 615. In another aspect, the thresholds 615 may include an engagement threshold, a listening threshold level, etc. Additionally, engagement module 610 may use marker storage module 616 to assist in storing a marker with content that is being presented, upon a determination by engagement level determination module 612, that a user's engagement level has dropped below one or more of the thresholds defined in threshold module 614.

Figure 7:
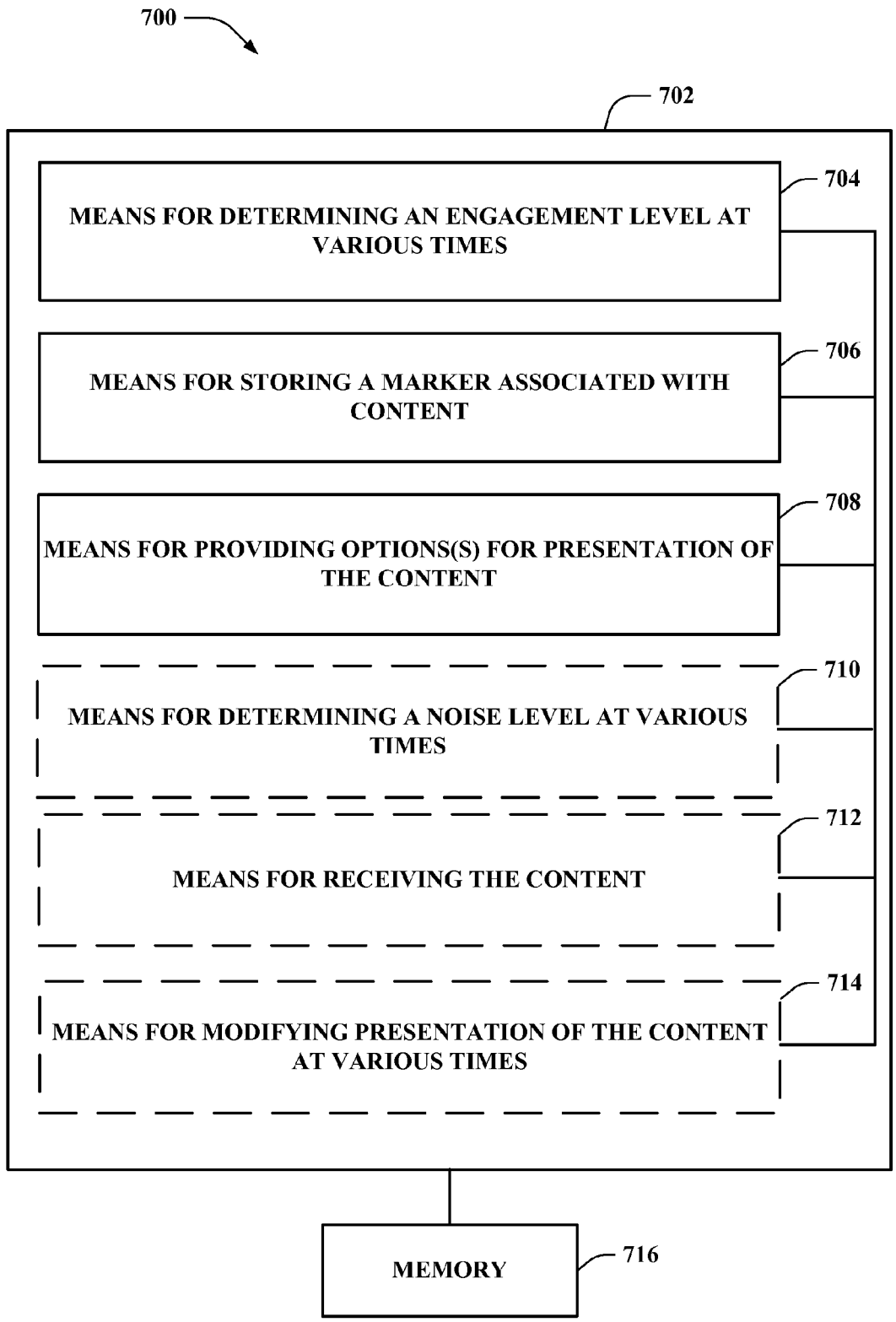
FIG. 7 depicts a block diagram of an example a communications device for using engagement level information to modify presentation of content, according to an aspect.

FIG. 7 depicts a block diagram of an exemplary communication system 700 operable to use engagement level information for one or more users to modify presentation of content. For example, system 700 can reside at least partially within a communications device (e.g., content providing system 600). It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction.

For instance, logical grouping 702 can include an electrical component that may provide means for determining an engagement level at various times 704. For example, the means for determining an engagement level 704 can include engagement module 610 of content providing system 600 and/or processor 630 of content providing system 600. In an aspect, the means for determining the engagement level 704 may be configured to determine that an engagement level at a first time is less than an engagement threshold at the first time. The engagement level may be based at least on contextual items associated with presentation of content by a content providing device. In an aspect, the means for determining the engagement level 704 may be configured to determine whether the engagement level at a second time is greater than or equal to the engagement threshold. In an aspect, the second time may be at least a threshold time duration (e.g., 30 seconds) after the first time. In an aspect, the means for determining the engagement level 704 may be configured to establish an engagement baseline based on one or more engagement factors, and derive the engagement threshold based on the engagement baseline. In an aspect in which the engagement level is determined for each user of two or more of users, the means for determining the engagement level 704 may be configured to determine that the engagement level for at least one user of the two or more users is less than the engagement threshold at the first time. In an aspect in which two or more users are within a presentation environment, the means for determining the engagement level 704 may be configured to determine the engagement level for a primary user. In an aspect in which the engagement level is determined for a first user that has a first user type, the means for determining the engagement level 704 may be configured to determine that a second user with a different user type is within a presentation environment at the second time. In an aspect, the means for determining the engagement level 704 may be configured to determine that a user is absent from the presentation environment at various times.

Further, logical grouping 702 can include an electrical component that may provide means for storing a marker associated with the content 706. For example, the means for storing 706 can include memory 604 of content providing system 600 and/or processor 630 of content providing system 600. In an aspect, the means for storing 706 may be configured to remove the marker from the storage upon the determination that the engagement level is greater than or equal to the engagement threshold at the second time. In another aspect, the means for storing 706 may be configured to store the marker in a memory associated with the content providing device, store the marker with an entity that is accessible by one or more other content providing devices from which a user may access the content, etc., or any combination thereof. In another aspect, the means for storing 706 may be configured to analyze a sound profile of the content for a lull threshold time duration prior to the first time to detect a lull in the content presentation, and store the marker at the detected lull in the content presentation. In another aspect, the means for storing 706 may be configured to store user specific markers for each user. In another aspect, the means for storing 706 may be configured to store a marker for a primary user. In another aspect, the means for storing 706 may be configured to store a user profile. In such an aspect, the user profile may also indicate a language preference for the user.

Further, logical grouping 702 can include an electrical component that may provide means for providing options for presentation of the content 708. For example, the means for providing 708 can include engagement module 610 of content providing system 600, communications module 650 of content providing system 600, and/or processor 630 of content providing system 600. In an aspect, the means for providing 708 may be configured to provide one or more presentation options for the content from the first time upon the determination that the engagement level is greater than or equal to the engagement threshold at the second time. In an aspect, the means for providing 708 may be configured to provide indication through the content providing device that the marker associated with the content at the first time is stored, and present the content from the first time upon a receipt of a response to the indication. In an aspect, the presentation options may include an option to present the content with at least a reduced volume level after the second time upon the determination that the engagement level is less than the engagement threshold at the second time. In an aspect, the presentation options may include an option to present the content using closed captioning after the second time upon the determination that the engagement level is less than the engagement threshold at the second time. In such an aspect, a language used during presentation of the content using closed captioning may be determined based on information stored in a user profile. In an aspect, the means for providing 708 may be configured to provide an option to present the content using closed captioning and/or provide an option to cease presentation of the content using closed captioning. In an aspect, the means for providing 708 may be configured to provide an option to resume non-modified presentation of the content. In an aspect, the means for providing 708 may be configured to provide a prompt for a user to allow user to determine whether to resume presentation of the content.

In an optional aspect, logical grouping 702 can include an electrical component that may provide means for determining that a noise level is above a listening threshold level 710. For example, the means for determining a noise level 710 can include engagement module 610 of content providing system 600, communications module 650 of content providing system 600, and/or processor 630 of content providing system 600.

In another optional aspect, logical grouping 702 can include an electrical component that may provide means for receiving content 712. For example, the means for receiving the content 712 can include engagement module 610 of content providing system 600, communications module 650 of content providing system 600, and/or processor 630 of content providing system 600. In an aspect, the content may be received through reception of a broadcast transmission, a multicast transmission, a unicast transmission, etc., or any combination thereof.

In another optional aspect, logical grouping 702 can include an electrical component that may provide means for modifying presentation of the content at various times 714. For example, the means for modifying presentation 714 can include engagement module 610 of content providing system 600, communications module 650 of content providing system 600, and/or processor 630 of content providing system 600. In an aspect, the means for modifying 714 may be configured to modify one or more presentation options for the content based at least in part on a determination that a user is present. In an aspect, the means for modifying 714 may be configured to detect an attribute associated with the content, determine that a user type is a user type for which access to the content with the detected attribute is limited, and ceasing presentation of the content. The attribute may be an indication that the content includes one or more characteristics such as but not limited to violence, adult language, adult situations, etc., or any combination thereof. Further, the attribute may be determined from program information associated with the content. In an aspect, the user type may include adult, child, adolescent, a user defined type, or any combination thereof. The user type may be detected based on a user's height, inputted age, prior usage, etc., or any combination thereof. In an aspect, the means for modifying 714 may be configured to present a description of the content on a user interface associated with the content providing device. In an aspect, the means for modifying 714 may be configured to present a blank screen on a user interface associated with the content providing device. In an aspect, the means for modifying 714 may be configured to modify one or more presentation attributes of the content upon the determination that the engagement level is less than the engagement threshold at the first time.

Additionally, system 700 can include a memory 716 that retains instructions for executing functions associated with the electrical components 704, 706, 708, 710, 712, and 714, and stores data used or obtained by the electrical components 704, 706, 708, 710, 712, 714 etc. While shown as being external to memory 716, it is to be understood that one or more of the electrical components 704, 706, 708, 710, 712, and 714 may exist within memory 716. In one example, electrical components 704, 704, 706, 708, 710, 712, and 714 can include at least one processor, or each electrical component 704, 704, 706, 708, 710, 712, and 714 can be a corresponding module of at least one processor. Moreover, in an additional or alternative example, electrical components 704, 706, 708, 710, 712, and 714 may be a computer program product including a computer readable medium, where each electrical component 704, 706, 708, 710, 712, and 714 may be corresponding code.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as code division multiple access (CDMA), time division multiple access (TDMA), frequency division multiple access (FDMA), Orthogonal Frequency-Division Multiple Access (OFDMA), Single Carrier Frequency Division Multiple Access (SC-FDMA) and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

The word "exemplary" is used herein to mean serving as an example, instance, or illustration. Any aspect or design described herein as "exemplary" is not necessarily to be construed as preferred or advantageous over other aspects or designs. Additionally, as used herein, a phrase referring to "at least one of" a list of items refers to any combination of those items, including single members. As an example, "at least one of: a, b, or c" is intended to cover: a, b, c, a-b, a-c, b-c, and a-b-c.

While the foregoing disclosure discusses illustrative aspects and/or implementations, it should be noted that various changes and modifications could be made herein without departing from the scope of the described aspects and/or embodiments as defined by the appended claims. Furthermore, although elements of the described aspects and/or implementations may be described or claimed in the singular, the plural is contemplated unless limitation to the singular is explicitly stated. Additionally, all or a portion of any aspect and/or implementation may be utilized with all or a portion of any other aspect and/or implementation, unless stated otherwise.

What is claimed is:

1. A method of providing content, comprising:
    determining an engagement level at a first time;
    comparing the engagement level to an engagement threshold to determine if the engagement level is less than the engagement threshold at the first time, wherein the engagement level is based at least on two or more contextual items associated with presentation of content by a content providing device;
    storing a marker associated with the content at the first time in storage when it is determined that the engagement level is less that the engagement threshold at the first time;
    determining whether the engagement level at a second time is greater than or equal to the engagement threshold; and
    modifying one or more presentation attributes of the content upon the determination that the engagement level is less than the engagement threshold at the first time, wherein the modifying further comprises focusing auditory presentation of the content away from a first user.

2. The method of claim 1, further comprising:
    providing one or more presentation options for the content from the first time upon a determination that the engagement level is greater than or equal to the engagement threshold at the second time.

3. The method of claim 1, wherein the second time is at least a threshold time duration after the first time.

4. The method of claim 1, wherein the second time is less than a threshold time duration after the first time; and further comprising:
    removing the marker from the storage upon a determination that the engagement level is greater than or equal to the engagement threshold at the second time.

5. The method of claim 1, wherein the one or more contextual items comprise at least one of:
    an ambient sound level;
    presence of one or more distraction sounds;
    speech detected from one or more users; or
    a viewing direction with respect to a user interface for at least one of the one or more users, or any combination thereof.

6. The method of claim 1, wherein determining the engagement level further comprises:
    establishing an engagement baseline based on one or more engagement factors; and
    deriving the engagement threshold based on the engagement baseline.

7. The method of claim 1, wherein storing the marker comprises at least one of:
    storing the marker in a memory associated with the content providing device;
    storing the marker with an entity that is accessible by one or more other content providing devices from which a user may access the content, or any combination thereof.

8. The method of claim 1, further comprising:
    determining that a noise level at the second time is above a listening threshold level; and
    providing an option to present the content using closed captioning.

9. The method of claim 1, wherein the storing the marker further comprises:
    analyzing a sound profile of the content for a lull threshold time duration prior to the first time to detect a lull in the content presentation; and
    storing the marker at the detected lull in the content presentation.

10. The method of claim 1, wherein the engagement level is determined for each user of two or more of users, wherein the determining further comprises determining that the engagement level for at least one user of the two or more users is less than the engagement threshold at the first time, and wherein the storing further comprises storing a user specific marker for each of the at least one user of the two or more users at the first time.

11. The method of claim 1, wherein two or more users are within a presentation environment, wherein the two or more users includes a primary user and a one or more secondary users, and wherein the engagement level is determined at the first time for the primary user.

12. The method of claim 1, further comprising:
    receiving the content, by the content providing device, using reception of at least one of a broadcast transmission, a multicast transmission, a unicast transmission, or any combination thereof.

13. The method of claim 1, wherein the engagement level is determined for the first user, and wherein the first user is associated with a first user type, and further comprising:
    determining that a second user is within a presentation environment at the second time, wherein the second user is associated with a second user type; and
    modifying one or more presentation options for the content at the second time based at least in part on the determination that the second user is present and the second user type.

14. The method of claim 1, wherein the detected level of interest associated with the first user includes that the first user is asleep.

15. The method of claim 1, wherein the detected level of interest of the first user is detected based on at least one of the first user's head direction, whether the first user's eyes are open, whether the first user has moved locations, whether the first user has left a presentation environment, one or more biometric measurements of the first user, or any combination thereof.

16. The method of claim 1, wherein the detected level of interest of the first user is detected using one or more devices associated with the first user.

17. The method of claim 1, wherein the focusing further comprises focusing auditory presentation of the content toward a second user, and wherein the modifying further comprises reducing an overall auditory presentation volume level to a level where auditory presentation focused towards the second user produces a substantially similar noise level at a location associated with the second user as a general auditory presentation produced at the location.

18. The method of claim 1, wherein the modifying further comprises reducing an auditory presentation volume of the content and using closed captioning.

19. The method of claim 2, wherein the providing further comprises:
providing an indication through the content providing device that the marker associated with the content at the first time is stored; and
presenting the content from the first time upon a receipt of a response to the indication.

20. The method of claim 2, wherein the one or more presentation options include an option to present the content with at least a reduced volume level after the second time upon the determination that the engagement level is less than the engagement threshold at the second time.

21. The method of claim 2, wherein the one or more presentation options include an option to present the content using closed captioning after the second time upon the determination that the engagement level is less than the engagement threshold at the second time.

22. The method of claim 6, wherein the one or more engagement factors include at least one of:
an ambient sound level;
a distraction propensity value based on a type of the content;
a baseline viewing direction for a user; or
an ambient light level, or any combination thereof.

23. The method of claim 8, further comprising:
determining the noise level at a third time is below the listening threshold level; and
providing an option at the third time to cease presenting the content using closed captioning.

24. The method of claim 13, wherein the modifying further comprises:
detecting an attribute associated with the content;
determining that the second user type is a user type for which access to the content with the detected attribute is limited; and
ceasing presentation of the content.

25. The method of claim 13, wherein the modifying further comprises:
providing a prompt for the first user to allow the first user to determine whether to resume presentation of the content, wherein the first user is a different user type than the second user type.

26. The method of claim 13, wherein the attribute is determined from program information associated with the content.

27. The method of claim 13, wherein the first user type includes at least one of adult, child, or adolescent.

28. The method of claim 13, wherein the first user type is detected based on at least one of a user's height, inputted age, prior usage, or any combination thereof.

29. The method of claim 13, wherein the modifying further comprises providing an option to the first user for presenting the content using closed captioning.

30. The method of claim 18, wherein reducing the auditory presentation volume further comprises muting the auditory presentation volume of the content.

31. The method of claim 21, wherein a language used during presentation of the content using closed captioning is determined based on information stored in a user profile.

32. The method of claim 3, wherein the threshold time duration is thirty seconds.

33. The method of claim 24, wherein the modifying further comprises:
presenting a blank screen on a user interface associated with the content providing device.

34. The method of claim 24, wherein the modifying further comprises:
presenting a description of the content on a user interface associated with the content providing device.

35. The method of claim 24, wherein the attribute is an indication that the content includes one or more characteristics including: violence, adult language, adult situations, or any combination thereof.

36. The method of claim 24, further comprising:
determining that the second user is absent from the presentation environment at a third time; and
providing an option to the first user to resume presentation of the content.

37. The method of claim 24, further comprising:
detecting that an engagement level associated with the second user is below an engagement threshold; and
providing an option to the first user to resume presentation of the content.

38. The method of claim 26, wherein the program information is accessible from at least one of:
information provided with the presented content;
information accessible from a program information entity;
information derived from an averaged noise level for the content; or
information derived from analysis of closed captioning information, or any combination thereof.

39. The method of claim 29, wherein the first user type is stored with a user profile for the first user, and wherein a language used during presentation of the content using closed captioning is determined based on information stored with the user profile for the first user.

40. An apparatus for communications, comprising:
means for determining an engagement level at a first time;
means for comparing the engagement level to an engagement threshold to determine if the engagement level is less than the engagement threshold at the first time, wherein the engagement level is based at least on two or more contextual items associated with presentation of content by a content providing device;
means for storing a marker associated with the content at the first time in storage when it is determined that the engagement level is less that the engagement threshold at the first time;
means for determining whether the engagement level at a second time is greater than or equal to the engagement threshold; and
means for modifying one or more presentation attributes of the content upon the determination that the engagement level is less than the engagement threshold at the first time, wherein the modifying further comprises focusing auditory presentation of the content away from a first user.

41. A computer program product, comprising:
a non-transitory computer-readable medium comprising:
at least one instruction for causing a computer to determine an engagement level at a first time;
at least one instruction for causing the computer to compare the engagement level to an engagement threshold to determine if the engagement level is less than an engagement threshold at the first time, wherein the engagement level is based at least on two or more contextual items associated with presentation of content by a content providing device;
at least one instruction for causing the computer to store a marker associated with the content at the first time in storage when it is determined that the engagement level is less that the engagement threshold at the first time;
at least one instruction for causing the computer to determine whether the engagement level at a second time is greater than or equal to the engagement threshold; and
at least one instruction for causing the computer to modify one or more presentation attributes of the content upon the determination that the engagement level is less than the engagement threshold at the first time, wherein the modifying further comprises focusing auditory presentation of the content away from a first user.

42. An apparatus for communications, comprising:
a processing system configured to:
determine an engagement level at a first time;
compare the engagement level to an engagement threshold to determine if the engagement level is less than the engagement threshold at the first time, wherein the engagement level is based at least on two or more contextual items associated with presentation of content by a content providing device;
store a marker associated with the content at the first time in storage when it is determined that the engagement level is less that the engagement threshold at the first time;
determine whether the engagement level at a second time is greater than or equal to the engagement threshold; and.
modify one or more presentation attributes of the content upon the determination that the engagement level is less than the engagement threshold at the first time, wherein the modifying further comprises focusing auditory presentation of the content away from a first user.

43. The apparatus of claim 42, wherein the processing system is further configured to:
provide one or more presentation options for the content from the first time upon the determination that the engagement level is greater than or equal to the engagement threshold at the second time.

44. The apparatus of claim 42, wherein the second time is at least a threshold time duration after the first time.

45. The apparatus of claim 42, wherein the second time is less than a threshold time duration after the first time; and wherein the processing system is further configured to:
remove the marker from the storage upon the determination that the engagement level is greater than or equal to the engagement threshold at the second time.

46. The apparatus of claim 42, wherein the one or more contextual items comprise at least one of:
an ambient sound level;
presence of one or more distraction sounds;
speech detected from one or more users;
a viewing direction with respect to a user interface for at least one of the one or more users, or any combination thereof.

47. The apparatus of claim 42, wherein the processing system is further configured to:
establish an engagement baseline based on one or more engagement factors; and
derive the engagement threshold based on the engagement baseline.

48. The apparatus of claim 42, wherein the processing system is further configured to:
store the marker in a memory associated with the content providing device;
store the marker with an entity that is accessible by one or more other content providing devices from which a user may access the content, or any combination thereof.

49. The apparatus of claim 42, wherein the processing system is further configured to:
determine that a noise level at the second time is above a listening threshold level; and
provide an option to present the content using closed captioning.

50. The apparatus of claim 42, wherein the processing system is further configured to:
analyze a sound profile of the content for a lull threshold time duration prior to the first time to detect a lull in the content presentation; and
store the marker at the detected lull in the content presentation.

51. The apparatus of claim 42, wherein the engagement level is determined for each user of two or more of users, and wherein the processing system is further configured to:
determine that the engagement level for at least one user of the two or more users is less than the engagement threshold at the first time; and
store a user specific marker for each of the at least one user of the two or more users at the first time.

52. The apparatus of claim 42, wherein two or more users are within a presentation environment, wherein the two or more users includes a primary user and a one or more secondary users, and wherein the engagement level is determined at the first time for the primary user.

53. The apparatus of claim 42, wherein the processing system is further configured to:
receive the content, by the content providing device, using reception of at least one of a broadcast transmission, a multicast transmission, a unicast transmission, or any combination thereof.

54. The apparatus of claim 42, wherein the engagement level is determined for a first user, and wherein the first user is associated with a first user type, and wherein the processing system is further configured to:
determine that a second user is within a presentation environment at the second time, wherein the second user is associated with a second user type; and
modify one or more presentation options for the content at the second time based at least in part on the determination that the second user is present and the second user type.

55. The apparatus of claim 42, wherein the detected level of engagement associated with the first user includes that the first user is asleep.

56. The apparatus of claim 42, wherein the detected level of engagement of the first user is detected based on at least one of the first user's head direction, whether the first user's eyes are open, whether the first user has moved locations, whether the first user has left a presentation environment, one or more biometric measurements for the first user, or any combination thereof.

57. The apparatus of claim 42, wherein the detected level of engagement of the first user is detected using one or more devices associated with the first user.

58. The apparatus of claim 42, wherein the processing system is further configured to:
focus the auditory presentation of the content toward a second user; and reduce an overall auditory presentation volume level to a level where the auditory presentation focused towards the second user produces a substantially similar noise level at a location associated with the second user as a general auditory presentation produced at the location.

59. The apparatus of claim 42, wherein the processing system is further configured to:
reduce an auditory presentation volume of the content; and use closed captioning.

60. The apparatus of claim 43, wherein the processing system is further configured to:
provide an indication through the content providing device that the marker associated with the content at the first time is stored; and
present the content from the first time upon a receipt of a response to the indication.

61. The apparatus of claim 43, wherein the one or more presentation options include an option to present the content with at least a reduced volume level after the second time upon the determination that the engagement level is less than the engagement threshold at the second time.

62. The apparatus of claim 43, wherein the one or more presentation options include an option to present the content using closed captioning after the second time upon the determination that the engagement level is less than the engagement threshold at the second time.

63. The apparatus of claim 44, wherein the threshold time duration is thirty seconds.

64. The apparatus of claim 47, wherein the one or more engagement factors include at least one of:
an ambient sound level;
a distraction propensity value based on a type of the content;
a baseline viewing direction for a user; or
an ambient light level, or any combination thereof.

65. The apparatus of claim 49, wherein the processing system is further configured to:
determine the noise level at a third time is below the listening threshold level; and
provide an option at the third time to cease presenting the content using closed captioning.

66. The apparatus of claim 54, wherein the processing system is further configured to:
detect an attribute associated with the content;
determine that the second user type is a user type for which access to the content with the detected attribute is limited; and
cease presentation of the content.

67. The apparatus of claim 54, wherein the processing system is further configured to:
provide a prompt for the first user to allow the first user to determine whether to resume presentation of the content, wherein the first user is a different user type than the second user type.

68. The apparatus of claim 54, wherein the attribute is determined from program information associated with the content.

69. The apparatus of claim 54, wherein the first user type includes at least one of adult, child, adolescent, or any combination thereof.

70. The apparatus of claim 54, wherein the first user type is detected is based on at least one of a user's: height, inputted age, prior usage, or any combination thereof.

71. The apparatus of claim 54, wherein the processing system is further configured to provide an option to the first user for presentation the content using closed captioning.

72. The apparatus of claim 59, wherein the processing system is further configured to mute the auditory presentation volume of the content.

73. The apparatus of claim 62, wherein a language used during presentation of the content using closed captioning is determined based on information stored in a user profile.

74. The apparatus of claim 66, wherein the processing system is further configured to:
present a blank screen on a user interface associated with the content providing device.

75. The apparatus of claim 66, wherein the processing system is further configured to:
present a description of the content on a user interface associated with the content providing device.

76. The apparatus of claim 66, wherein the attribute is an indication that the content includes one or more characteristics including: violence, adult language, adult situations, or any combination thereof.

77. The apparatus of claim 66, wherein the processing system is further configured to:
determine that the second user is absent from the presentation environment at a third time; and
provide an option to the first user to resume presentation of the content.

78. The apparatus of claim 66, wherein the processing system is further configured to:
detect that an engagement level associated with the second user is below an engagement threshold; and
provide an option to the first user to resume presentation of the content.

79. The apparatus of claim 68, wherein the program information is accessible from at least one of:
information provided with the presented content;
information accessible from a program information entity;
information derived from an averaged noise level for the content; or
information derived from analysis of closed captioning information, or any combination thereof.

80. The apparatus of claim 71, wherein the first user type is stored with a user profile for the first user, and wherein a language used during presentation of the content using closed captioning is determined based on information stored with the user profile for the first user.

* * * * *